(12) United States Patent
Teplitsky et al.

(10) Patent No.: US 9,239,773 B1
(45) Date of Patent: Jan. 19, 2016

(54) METHOD AND SYSTEM FOR DEBUGGING A PROGRAM THAT INCLUDES DECLARATIVE CODE AND PROCEDURAL CODE

(71) Applicant: Cadence Design Systems, Inc., San Jose, CA (US)

(72) Inventors: Marat Teplitsky, Kfar-Sava (IL); Reuven Naveh, Jerusalem (IL); Rotem Gubes, Tel Aviv (IL); Raz Azaria, Nahariya (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/526,529

(22) Filed: Oct. 29, 2014

(51) Int. Cl.
 *G06F 9/44* (2006.01)
 *G06F 11/36* (2006.01)

(52) U.S. Cl.
 CPC .................... *G06F 11/3636* (2013.01)

(58) Field of Classification Search
 USPC .................................................. 717/123–129
 IPC .......................... G06F 11/362,11/3664, 11/3668
 See application file for complete search history.

(56) References Cited

U.S. PATENT DOCUMENTS

| | | | | |
|---|---|---|---|---|
| 6,049,673 A * | 4/2000 | McComb et al. | | 717/164 |
| 6,125,442 A * | 9/2000 | Maves et al. | | 712/220 |
| 6,324,682 B1 * | 11/2001 | McComb et al. | | 717/104 |
| 6,668,369 B1 * | 12/2003 | Krebs | | G06F 11/3664 714/E11.217 |
| 7,181,241 B2 * | 2/2007 | Fukuda | | 455/556.1 |
| 7,281,241 B2 | 10/2007 | Benoudiz et al. | | |
| 7,568,184 B1 * | 7/2009 | Roth | | G06F 8/74 717/123 |
| 8,086,455 B2 * | 12/2011 | Gong et al. | | 704/242 |
| 8,201,152 B2 * | 6/2012 | Li | | G06F 11/362 717/129 |
| 8,282,701 B2 * | 10/2012 | Schiess | | C22C 33/0271 75/231 |
| 8,327,337 B2 * | 12/2012 | Barsness | | G06F 11/362 714/38.1 |
| 8,443,340 B2 * | 5/2013 | Stairs | | G06F 11/362 717/100 |
| 8,468,500 B2 * | 6/2013 | Hatabu | | G06F 11/3636 717/124 |
| 8,495,590 B2 * | 7/2013 | Bates | | G06F 11/3636 715/810 |
| 8,499,287 B2 * | 7/2013 | Shafi | | G06F 8/314 717/125 |
| 8,656,368 B1 * | 2/2014 | Ovadia et al. | | 717/130 |
| 9,009,678 B2 * | 4/2015 | Bates | | G06F 11/362 717/124 |
| 2014/0282414 A1 | 9/2014 | Chazan et al. | | |

OTHER PUBLICATIONS

Olston et al, "Inspector Gadget: A Framework for Custom Monitoring and Debugging of Distributed Dataflows", ACM, pp. 1221-1223, 2011.*
Thomas et al, "Lowering Overhead in Sampling-based Execution Monitoring and Tracing", ACM, pp. 101-110, 2011.*
Schwalb et al, "Component-Based Models for Runtime Control and Monitoring of Embedded Systems", ACM, pp. 31-36, 2012.*
Milicevic et al, "Unifying Execution of Imperative and Declarative Code", ACM/IEEE, pp. 511-520, 2011.*

* cited by examiner

*Primary Examiner* — Anil Khatri
(74) *Attorney, Agent, or Firm* — Pearl Cohen Zedek Latzer Baratz LLP

(57) ABSTRACT

A method for debugging a program that includes declarative code and procedural code includes presenting to a user on an output device data relating to execution of the procedural code and data relating to execution of the declarative code. The data is presented in the form of a sequence of execution events corresponding to a computational flow of an execution of the program.

17 Claims, 6 Drawing Sheets

Present on an output device data relating to execution of a procedural code of a program and generation solving data relating to execution of a declarative code of the program in the form of a sequence of execution events corresponding to a computational flow of an execution of the program
102

Record execution of the procedural code of the program, linking, for each step in the execution of the procedural code, execution events and portions of the procedural code that was executed and caused the occurrence of that execution events
112

Record the execution of the declarative code of the program, linking the execution events and portions of the declarative code that was executed and caused the execution events
114

Record procedural calls from declarative code and calls of declarative calls from procedural code
116

Save all recorded execution lines and calls in chronological order
118

When a user queries a particular variable to determine the reason it got a certain value, present to the user the last execution line that caused the variable to obtain that value
122

Present declarative code-based steps using a debug tool set that is also used for debugging procedural code
124

Present procedural and declarative based execution lines in a unified chronological sequence
126

Fig. 2B

METHOD AND SYSTEM FOR DEBUGGING A PROGRAM THAT INCLUDES DECLARATIVE CODE AND PROCEDURAL CODE

FIELD OF THE INVENTION

The present disclosure relates to debugging. More specifically, the present invention relates to method and system for debugging a program that includes declarative code and procedural code.

BACKGROUND OF THE INVENTION

Debugging is a methodological process in which a technician systematically searches for anomalies or discrepancies (hereinafter—anomalies) in a computer program or an electronic hardware component, and fixes them.

Typically, debugging extends from finding and fixing small errors to lengthy and tedious data collecting, analysis and scheduling updates.

Debugging involves human skills and typically depends on the programming language use and the available debugging tools (also referred to as—debuggers).

There are known debugging tools for procedural code and separate known debugging tools for declarative code.

SUMMARY OF THE INVENTION

There is thus provided, according to some embodiments of the present invention, a method for debugging a program that includes declarative code and procedural code. The method may include presenting to a user on an output device data relating to execution of the procedural code and data relating to execution of the declarative code relating to execution of the declarative code in the form of a sequence of execution events corresponding to a computational flow of an execution of the program.

According to some embodiments of the present invention the method may also include, during an execution of the program: recording execution steps of the procedural code of the program, linking, for each step of the execution of the procedural code, execution events and portions of the procedural code that was executed and caused these execution events; recording execution of the declarative code, linking the execution events and portions of the declarative code that was executed and caused the execution events; recording procedural calls from the declarative code and computational processes performed due to the declarative code from procedural code; and saving the recorded execution steps of the procedural code, the recorded execution of the declarative code and the recorded calls in a chronological order.

In some embodiments, the declarative code may include constraints, and saving the recorded execution of the declarative code may include abstracting a constraint solving algorithm for solving the constraints to reduction, assignment and rollback actions.

In some embodiments, the method may include, during a debug stage, when a user queries a particular variable of the program, presenting to the user a last execution line that caused the variable to obtain a current value.

According to some embodiments, the method may include, during a debug stage, presenting declarative code-based execution steps using a debug tool that is also used for debugging the procedural code.

In some embodiments, the data relating to execution of the declarative code may be saved in a relational format.

In some embodiments, the relational format may include one or a plurality of data bases.

According to some embodiments, the output device is a display device.

According to some embodiments of the present invention, there is provided a non-transitory computer readable storage medium for debugging a program that includes declarative code and procedural code, having stored thereon instructions that when executed by a processor will cause the processor to present to a user on an output device data relating to execution of the procedural code and data relating to execution of the declarative code relating to execution of the declarative code in the form of a sequence of execution events corresponding to a computational flow of an execution of the program.

According to some embodiments, there is provided a system for debugging a program that includes declarative code and procedural code. The system may include: a storage device; and a processing unit, coupled to the storage device and configured to present to a user on an output device data relating to execution of the procedural code and data relating to execution of the declarative code in the form of a sequence of execution events corresponding to a computational flow of an execution of the program.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

FIG. 1 illustrates a method of debugging a program that includes declarative code and procedural code, according to some embodiments of the present invention.

FIG. 2A illustrates the actions taken during the execution stage, of a method of debugging a program that includes declarative code and procedural code, according to some embodiments of the present invention.

FIG. 2B illustrates the actions taken during the debug stage, of a method of debugging a program that includes declarative code and procedural code, according to some embodiments of the present invention.

DETAILED DESCRIPTION OF THE INVENTION

Figure 3:
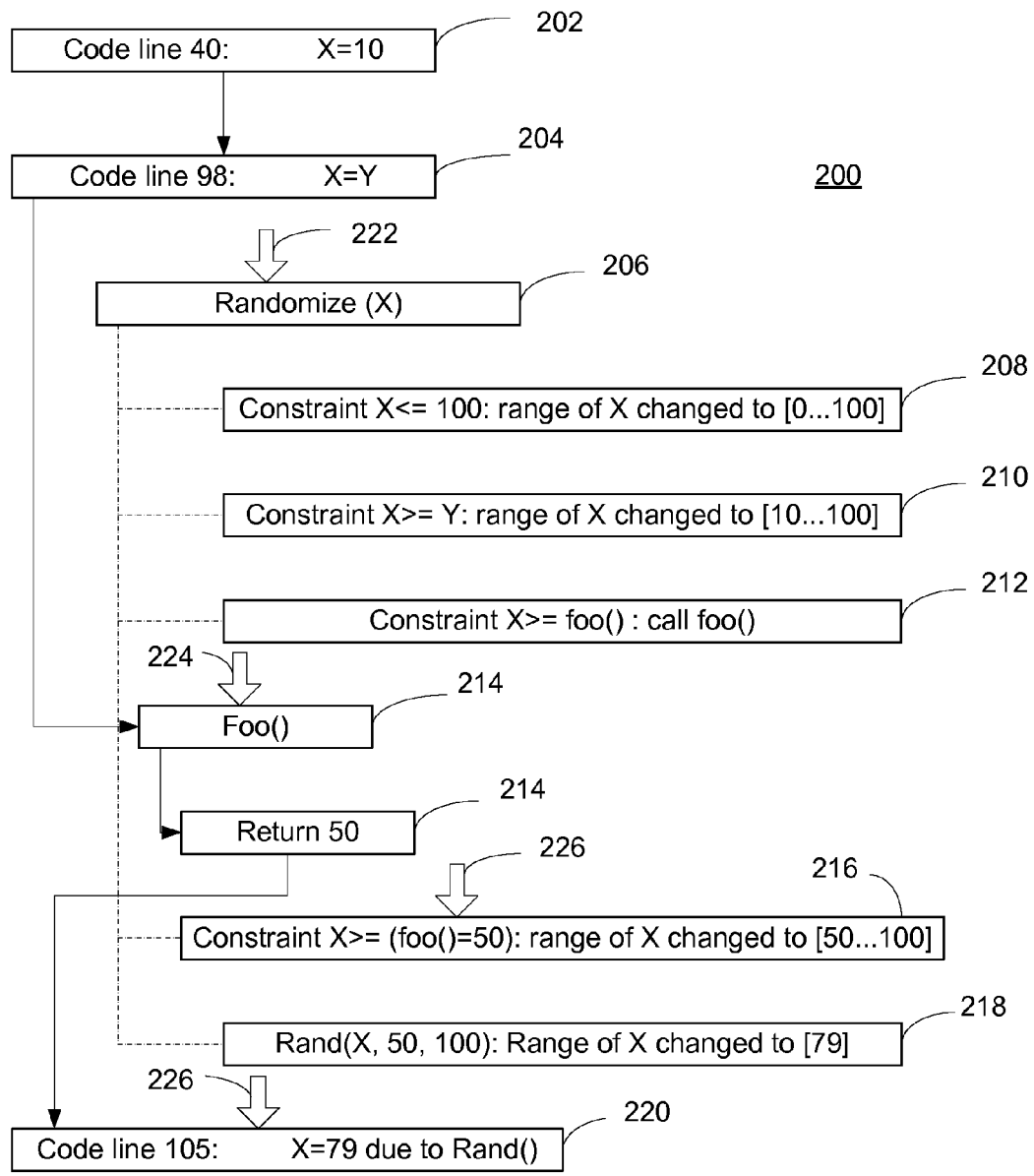
FIG. 3 illustrates a presentation of computational flow to a user by a debugging tool, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The aim of a debugging process is to understand the root cause of a problem.

A program to be debugged may include procedural code and declarative code. Procedural code is a programming paradigm based on procedures. Procedures (also referred to as "routines", "methods" and "functions") contain a series of computational steps to be executed. Practically, procedural code includes a list of ordered instructions instructing the computer what to do step by step and how to perform advancing along the program code. Declarative code refers to a style of programming that defines the structure and elements of a program that expresses the logic of a computation without describing the control flow. For example, declarative code may include constraints, such as, x=50.

Functional verification environments, for example, use randomly generated stimuli to verify a device under test (DUT). The stimulus generation is programmed using a combination of procedural code, and declarative constraints. Programming errors in such environments may be found in every element of the environment (procedural code, constrained-random-code, VIP code, VIP constraints, etc.).

A debugger typically allows a programming expert (hereinafter—"programmer" or "user") to follow the execution of a program and detect anomalies. In some cases, automatic debugging may be performed by the debugger, but essentially, a human programmer is needed to monitor and intervene in the debugging process. Typically a debugger displays a source code or assembly code of the program under test on a graphical user interface (hereinafter referred to as GUI). The debugger includes functions, such as performing break point setting, step execution, and the like. For example, in step execution using the GUI, the debugger executes one line of the source code or one instruction of the assembly code, and if there is a problematic code which leads to an error in a result of execution of the one instruction of the source code or assembly code, the debugger highlights a problematic portion or displays an auxiliary code, message, or the like which represents details of the error. Accordingly, the programmer can easily find the problematic code.

A post-process debugging method was introduced which involves recording of a specific program execution and allowing an on-line or off-line analysis of that execution. When recording the execution, all execution events that had occurred in that execution, such as, for example, function calls, values assigned for parameters of called functions, values assigned to variables, conditional statements, etc are saved. Information relating to the execution events encountered during an execution is saved (e.g., into a database, memory, etc.), allowing the review of the recorded execution in a user interface while mimicking the look and feel of a regular debugging tool. Thus, the user may go back and forth (up to the last execution event that was recorded) and view various execution events of that specific execution, including the related information of these events. Using such a post-process debug method allows the user to analyze any execution event and find the execution events that caused it to occur the way it did.

In such debugging method, the recording phase of the program being debugged may have ended or may have paused, and all the information that was collected regarding the execution of the tested program has been processed and stored. At that stage, the collected information is available and can help debug any previous point of time in the run of the program. It is noted, however that that the process of the program being debugged has not necessarily been terminated.

A post-process debugger is an example of a tool that enables the users to trace the origin of the issue they face, using cause-based navigation. This is basically a reverse-debugger that enables a user to step not only forward in the program sequence, but also backwards, from the error- to its cause. We will refer to this method of debug as reverse-debugging.

To date, there exist separate debugging tools for debugging procedural code and for debugging declarative code.

Thus, a full understanding of a cause of a bug in the tested program is very hard to reach when the cause involves both procedural code and declarative constraints. Such debug flow demands various tools and log files in order to get to the root of the problem and may include numerous re-runs of the simulation test, knowledge and training on different platforms.

Declarative code debugging and procedural code debugging are typically different, and therefore, traditionally, require the use of different debugging tools.

Procedural code debugging is typically flow oriented. A debugging tool for procedural code typically follows the logical flow of the program. In the debugging of declarative code (e.g. constraints), typically logs are used, and the user relies on trial and error to understand the causes of an error in a constraint model.

According to some embodiments of the present invention, novel debugging method and system are introduced, that incorporate declarative code debugging (e.g., constraints solving process) with procedural code debugging. In some embodiments of the present invention debugging method and system incorporate declarative code debugging with procedural code post-process debugging. In some other embodiments of the invention debugging method and system incorporate declarative code debugging with run-time debugging.

According to some embodiments of the present invention, a declarative code debugging process (e.g., constraint-solving process) is broken down into procedural-like steps. These steps may be then incorporated into a procedural code debugger, making the procedural code debugger a multi-purpose unified debug tool. Some embodiments of the present invention present a system for unified debugging of procedural code and declarative code.

System and method for unified debugging of procedural code and declarative code may include various features and capabilities, such as:

a) Analysis of bug causes derived from both declarative code (e.g., constrained-random code) and procedural code.

For example one may follow modifications to a certain variable resulting from both procedural and constraint solving steps;

b) Seamless stepping into constraint solving code from procedural code and vice versa;

c) The ability to apply the same breakpoints/watch-points on constraint solving and procedural steps; and d) Debugging of solving steps in post-process.

To integrate constraint solving info into a procedural flow, micro-procedural steps may be used, derived from the constraint-solving process.

"Constraint solving", in the context of the present specification, refers to the process of obtaining a solution e.g., using a constrained random stimuli generator (hereinafter—generator), for a constraint problem.

A constraint solving step involves a decision made during a solving phase. Each meaningful operation typically produces a constraint solving step describing the action that was performed and other relevant data. Some main constraint solving steps may include:

a) Reduction—occurs when the generator (sometimes also referred to as "solver") reduces the set of permissible values for a field;

b) Randomization—occurs when the generator sets a final value to a field from a legal set of values;

c) Roll back—occurs when the generator reduces a range of a field, rendering it empty.

Each of these steps reflects changes the generator had done on variables range as a result of applying constraints.

The next example illustrates declarative code solving steps. Hierarchical ordered steps are performed that lead to assignments for all variables in a certain constrained problem, as follows:

Consider the following declarative pseudo-code:

$uint\ X,Y,Z:[2\ldots10];$ $constraint\ X*Y==Z;$ $constraint\ Y<5;$ \hfill (1)

The above declarative pseudo-code may be solved as follows:

Variables X, Y, Z each may have a value between 2 and 10. Y is reduced from any value between 2 to 10 to any value between 2 and 5 (excluding 5), due to the constraint Y<5.

X is reduced from any value between 2 to 10, to any value between 2 to 5, Z is reduced from any value between 2 to 10 to any value between 4 to 10, and Y is reduced from any value between 2 to 10 to any value between 2 to 4, all due to the constrain Y<5.

Thus, following a randomization step, where X may randomly be assigned a value between 2 to 5, for example 3, Z is reduced from any value between 4 to 10, to any value between 6 to 9, Y is reduced from any value between 2 to 4 to any value between 2 to 3, due to the constraint X*Y==Z.

Y is randomly assigned 3 from the allowed range of 2 to 3, and finally Z is reduced to 6 from the allowed range of 6 to 9.

According to some embodiments of the present invention, procedural computation steps and declarative computational solving steps are combined into and presented by a single sequence of events, when debugging. This allows navigation between the steps, for example in a post-process debugger. Thus, solving steps and procedural steps may be debugged in the same manner, and one may lead to the other.

According to some embodiments of the present invention, constraint solving steps are transformed into procedural-like steps. This may be implemented, for example, in post-process debugging by saving data of execution events relating to the declarative code in a relational format that allows presenting that data in a procedural-like form (e.g., cause and effect). In some embodiments the data of execution events relating to the declarative code may be constraint solving data.

Relational format may be, for example, a relational database. This allows following the computational flow of the program for procedural code and declarative code. Specifically, connectivity of cause and effect in the declarative code and not just in the procedural code when the program is executed may thus be determined.

FIG. 1 illustrates a method 100 of debugging a program that includes declarative code and procedural code, according to some embodiments of the present invention. The method may include presenting 102 to a user on an output device data relating to execution of the procedural code and constraint solving data relating to execution of the declarative code in the form of a sequence of execution events corresponding to a computational flow of an execution of the program.

According to some embodiments of the present invention, a method of debugging a program that includes declarative code and procedural code may include the following:

1) In the execution stage 110 of the program debugged, as illustrated in FIG. 2A:

a) recording 112 of the execution of the procedural code of the program, linking, for each step in the execution of the procedural code, the execution events and portions of the procedural code that was executed and caused the occurrence of that execution events;

b) recording 114 the execution of the declarative code of the program, linking the execution events and portions of the declarative code that was executed and caused the execution events. For example, if the declarative code includes constaints, then during the execution of the constraint code, all constraint solving steps are to be recorded and saved. This may include, for example: abstracting the constraint solving algorithm used to solve the constraints to reduction, assignment and rollback actions; recording each step executed by the constraint solving algorithm as an execution line in a structure similar to the structure of procedural code execution lines; and, linking each execution line of the recorded steps executed by the constraint solving algorithm to the calculated or assigned variable, legal rage or value, related to that step;

c) recording 116 procedural calls from declarative code and calls of computational processes performed due to the declarative code from procedural code.

d) saving 118 the recorded execution lines and calls in chronological order, for example in a database.

2) in the debug stage 120, as illustrated in FIG. 2B:

a) when a user queries a particular variable to determine the reason it got a certain value, presenting 122 to the user the last execution line that caused the variable to obtain that value. This may be done, for example, by searching the database, finding that last execution line and presenting it to the user on an output device (e.g., in a graphical user interface for display on a display device);

b) presenting 124 declarative code-based steps using a debug tool set that is also used for debugging procedural code. This includes, for example: presenting constraints as source line/s; reduction of variable ranges or randomization as an assignment execution;

c) presenting 126 procedural and declarative based execution lines in a unified chronological sequence; upon a user request, stepping into procedural execution lines called from declarative execution lines, and vice versa.

FIG. 3 illustrates a presentation of computational flow 200 to a user by a debugging tool, according to some embodiments of the present invention, where the debugged program includes both procedural code and declarative code (handled by a constraint solver). The continuous lines represent the computation flow between procedural code elements (e.g., code lines), whereas the dashed lines represent links between declarative code elements (e.g., constraints). The hollow arrows 224, 224, 226, represent the connectivity flow between the computation of a procedural code portion of the program and the computation of a declarative code portion of the program. In this example, initially the computation flows through code line 40 assigning (202) X the value of 10, followed by code line 98 assigning (204) X the value of Y. The debugging flow is then directed to declarative code computation, that includes randomizing (206) a value for X, which is then subjected to three constraints: a) constraint 208 dictating that X be equal or smaller than 100 (effectively allowing the value of X to be any value between 0 and 100), b) constraint 210 dictating that X be equal or greater than Y (from which follows that the range for a value of X is limited between 10 to 100, and c) constraint 212 dictating that X is assigned a value computed by method foo( ), from which follows that method foo( ) is called. This is where the debugging flow returns to procedural code, executing 214 method foo( ), returning 216 the value 50. Next some more declarative code is involved, where constraint 216 dictates that the value of X be equal or greater than the computed value of foo( ) (which is 50), limiting that value between 50 to 100. Randomizing (218) X limits the value of X to 79, moving to another procedural code portion where X is assigned (220) the value of 79, based on the previous randomization.

In some embodiments of the present invention, cause analysis may be applied to solving declarative code. In order to achieve that each declaration-caused execution is mapped to its cause or causes—which are the steps that affected the variables that participate in the solving event.

FIG. 3 illustrates mapped relationships 300 between solving acts with respect to the above mentioned pseudo-code (1). Each solving act points (see arrows) at its cause or causes—previous steps that changed the same variables that the step has.

Reduction 312 points at reduction 306, at which randomization 310 also points. Randomization 308 points at reduction 304, at which reduction 306 also points. Reduction 306 also points at reduction 302. Reduction 304 too points at reduction 302.

Thus, by presenting the solving acts that relate to declarative code, in a cause and effect manner, it is possible to follow the computational flow of the declarative portion of the program, allowing a user to easily locate and investigate bugs in the declarative code and procedural code portions of program.

Figure 4:
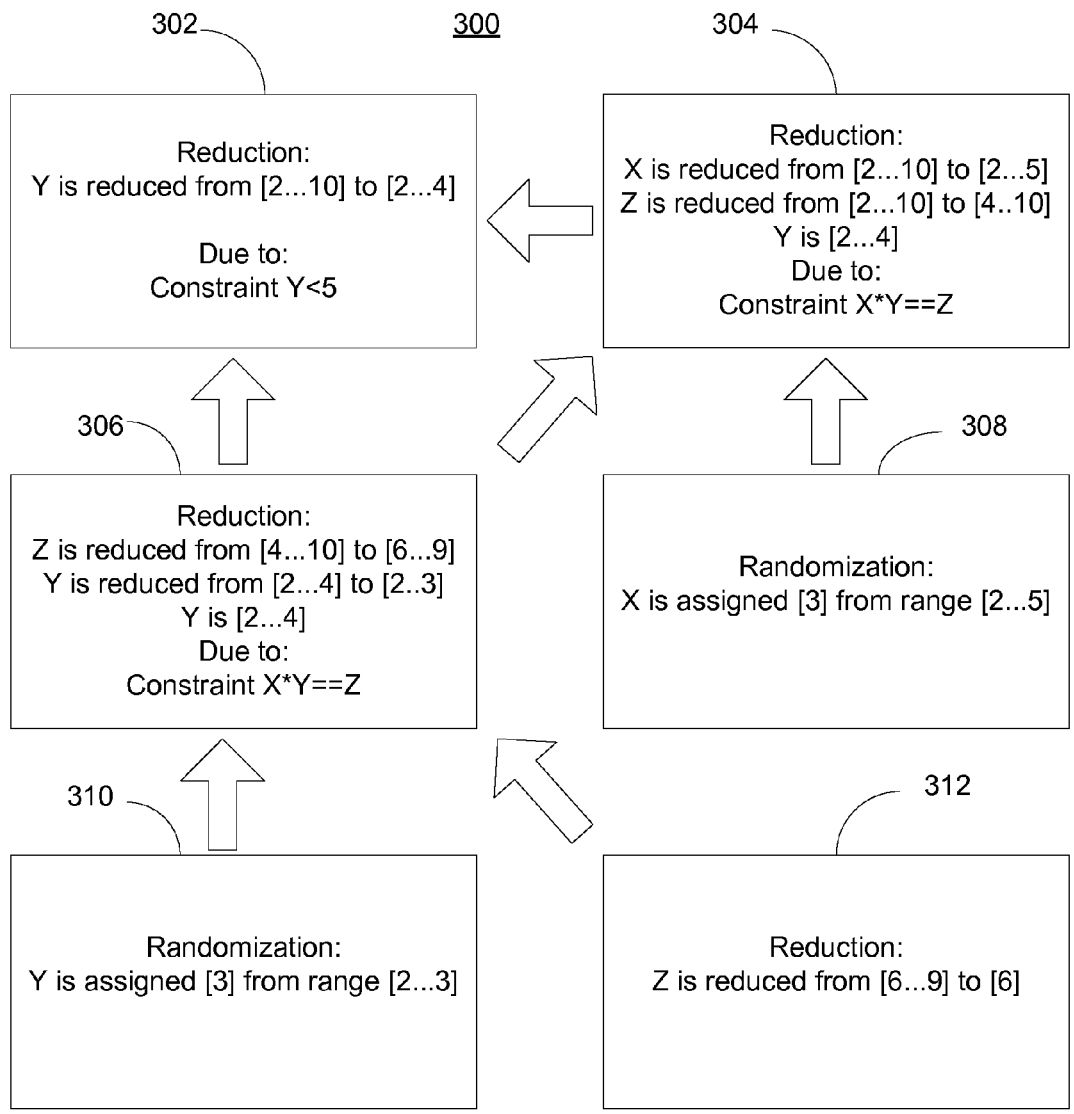
FIG. 4 illustrates mapped relationships between solving acts, according to some embodiments of the present invention.
Figure 5:
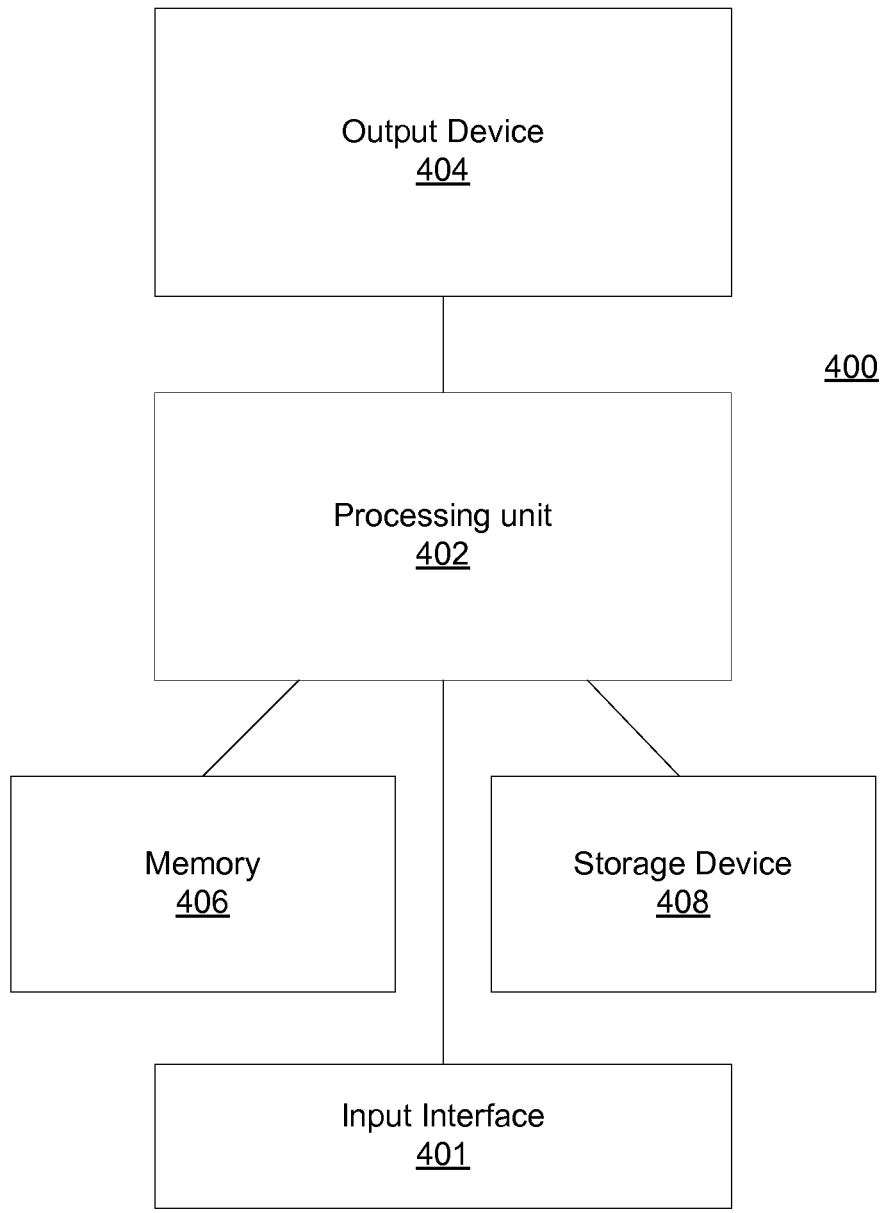
FIG. 5 illustrates a system for debugging a program that includes declarative code and procedural code, according to some embodiments of the present invention.

FIG. 4 illustrates a system 400 for debugging a program that includes declarative code and procedural code, according to some embodiments of the present invention.

System 400 may include a processing unit 402 (e.g., one or a plurality of processors, on a single machine or distributed on a plurality of machines) for executing a method according to some embodiments of the present invention.

System 400 may include an input interface 401 for receiving data and instructions from a user, such as, for example, one or a plurality of keyboards, pointing devices, touch sensitive surfaces (e.g. touch sensitive screens), etc. for allowing a user to input commands and data. Processing unit 402 may be linked with memory 406 on which a program implementing a method according to some embodiments of the present invention and corresponding data may be loaded and run from and data may be saved, and storage device 408, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 404 (e.g., display device such as CRT, LCD, LED etc.) on which one or a plurality user interfaces associated with a program implementing a method according to some embodiments and corresponding data may be presented.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method of debugging a program that includes declarative code and procedural code, the method comprising,
   recording execution steps of the procedural code, linking, for each of the execution steps, execution events that occur during the execution of the step with portions of the procedural code that were previously executed and that caused these execution events;
   recording execution of the declarative code, linking the execution events with portions of the declarative code that was executed and that caused the execution events; and
   recording procedural calls from the declarative code and computational processes that were performed due to execution of the declarative code;

saving data that includes the recorded execution steps of the procedural code, the recorded execution of the declarative code and a chronological order of the recorded calls; and in post-process debugging, presenting the saved data on an output device in the form of a sequence of execution events corresponding to a computational flow of the execution of the program.

2. The method of claim 1, wherein the declarative code comprises constraints, and wherein saving the recorded execution of the declarative code comprises abstracting a constraint solving algorithm for solving the constraints to reduction, assignment and rollback actions.

3. The method of claim 1, further comprising:
during a debug stage, when a user queries a particular variable of the program, presenting to the user a last execution line that caused the variable to obtain a current value.

4. The method of claim 1, further comprising:
during a debug stage, presenting declarative code-based execution steps using a debug tool that is also used for debugging the procedural code.

5. The method of claim 1, wherein the data is saved in a relational format.

6. The method of claim 5, wherein the relational format comprises one or a plurality of data bases.

7. The method of claim 1, wherein the output device is a display device.

8. A non-transitory computer readable storage medium for debugging a program that includes declarative code and procedural code, having stored thereon instructions that when executed by a processor will cause the processor to:
during an execution of the program,
record execution steps of the procedural code, linking, for each of the execution steps, execution events that occur during the execution of the step with portions of the procedural code that were previously executed and that caused these execution events;
record execution of the declarative code, linking the execution events with portions of the declarative code that was executed and that caused the execution events; and
record procedural calls from the declarative code and computational processes that were performed due to execution of the declarative code;
save data that includes the recorded execution steps of the procedural code, the recorded execution of the declarative code and a chronological order of the recorded calls; and
in post-process debugging, present the saved data on an output device in the form of a sequence of execution events corresponding to a computational flow of the execution of the program.

9. The non-transitory computer readable storage medium of claim 8, wherein the declarative code comprises constraints, and wherein the instructions to save the recorded execution of the declarative code comprises instructions to abstract a constraint solving algorithm for solving the constraints to reduction, assignment and rollback actions.

10. The non-transitory computer readable storage medium of claim 8, having stored thereon instructions that when executed by a processor will cause the processor further to:
during a debug stage, when a user queries a particular variable of the program, present to the user a last execution line that caused the variable to obtain a current value.

11. The non-transitory computer readable storage medium of claim 8, having stored thereon instructions that when executed by a processor will cause the processor further to:
during a debug stage, present declarative code-based execution steps using a debug tool that is also used for debugging the procedural code.

12. The non-transitory computer readable storage medium of claim 8, wherein the data is saved in a relational format.

13. The non-transitory computer readable storage medium of claim 12, wherein the relational format comprises one or a plurality of data bases.

14. A system for debugging a program that includes declarative code and procedural code, the system comprising:
a storage device; and
a processing unit, coupled to the storage device and configured to during an execution of the program,
record execution steps of the procedural code, linking, for each of the execution steps, execution events that occur during the execution of the step with portions of the procedural code that were previously executed and that caused these execution events;
record execution of the declarative code, linking the execution events with portions of the declarative code that was executed and that caused the execution events; and
record procedural calls from the declarative code and computational processes that were performed due to execution of the declarative code;
save data that includes the recorded execution steps of the procedural code, the recorded execution of the declarative code and a chronological order of the recorded calls; and
in post-process debugging, present the saved data in the form of a sequence of execution events corresponding to a computational flow of an execution of the program.

15. The system of claim 14, wherein the processing unit is further configured to:
during a debug stage, when a user queries a particular variable of the program, present to the user a last execution line that caused the variable to obtain a current value.

16. The system of claim 14, wherein the processing unit is further configured to:
during a debug stage, present declarative code-based execution steps using a debug tool that is also used for debugging the procedural code.

17. The system of claim 14, further comprising a display device as the output device.

* * * * *